No. 661,236. Patented Nov. 6, 1900.
S. S. CHISHOLM.
MACHINE FOR COMPRESSING MATERIAL INTO FORM.
(Application filed Feb. 23, 1900.)
(No Model.) 2 Sheets—Sheet 1.

Witnesses:
Frank S. Blanchard
Howard M. Cox

Inventor:
Samuel S. Chisholm
By Jesse Cox
Attorney.

No. 661,236. Patented Nov. 6, 1900.
S. S. CHISHOLM.
MACHINE FOR COMPRESSING MATERIAL INTO FORM.
(Application filed Feb. 23, 1900.)
(No Model.) 2 Sheets—Sheet 2.

Witnesses:
Frank S. Blanchard
Howard M. Cox

Inventor:
Samuel S. Chisholm
By Jesse Cox
Attorney

THE NORRIS PETERS CO., PHOTO-LITHO., WASHINGTON, D. C.

UNITED STATES PATENT OFFICE.

SAMUEL S. CHISHOLM, OF CHICAGO, ILLINOIS.

MACHINE FOR COMPRESSING MATERIAL INTO FORM.

SPECIFICATION forming part of Letters Patent No. 661,236, dated November 6, 1900.

Application filed February 23, 1900. Serial No. 6,270. (No model.)

*To all whom it may concern:*

Be it known that I, SAMUEL S. CHISHOLM, a citizen of the United States, residing in the city of Chicago, in the county of Cook and State of Illinois, have invented certain new and useful Improvements in Machines for Compressing Material into Form, of which the following is a specification.

My invention relates to improvements in machines for compressing material into form in which reciprocating feed-boxes or chargers are used for delivering the material to be made into bricks from the feed-hopper of the machine to the molds thereof; and the object of my invention is to provide novel means whereby the material to be made into bricks or blocks after the same has been delivered into the mold is evenly distributed in the mold and compacted and the top of said material leveled off previous to being pressed in the mold by the plunger or plungers of the machine entering said mold. I attain this object by the mechanism illustrated in the accompanying drawings, in which—

Figure 1:
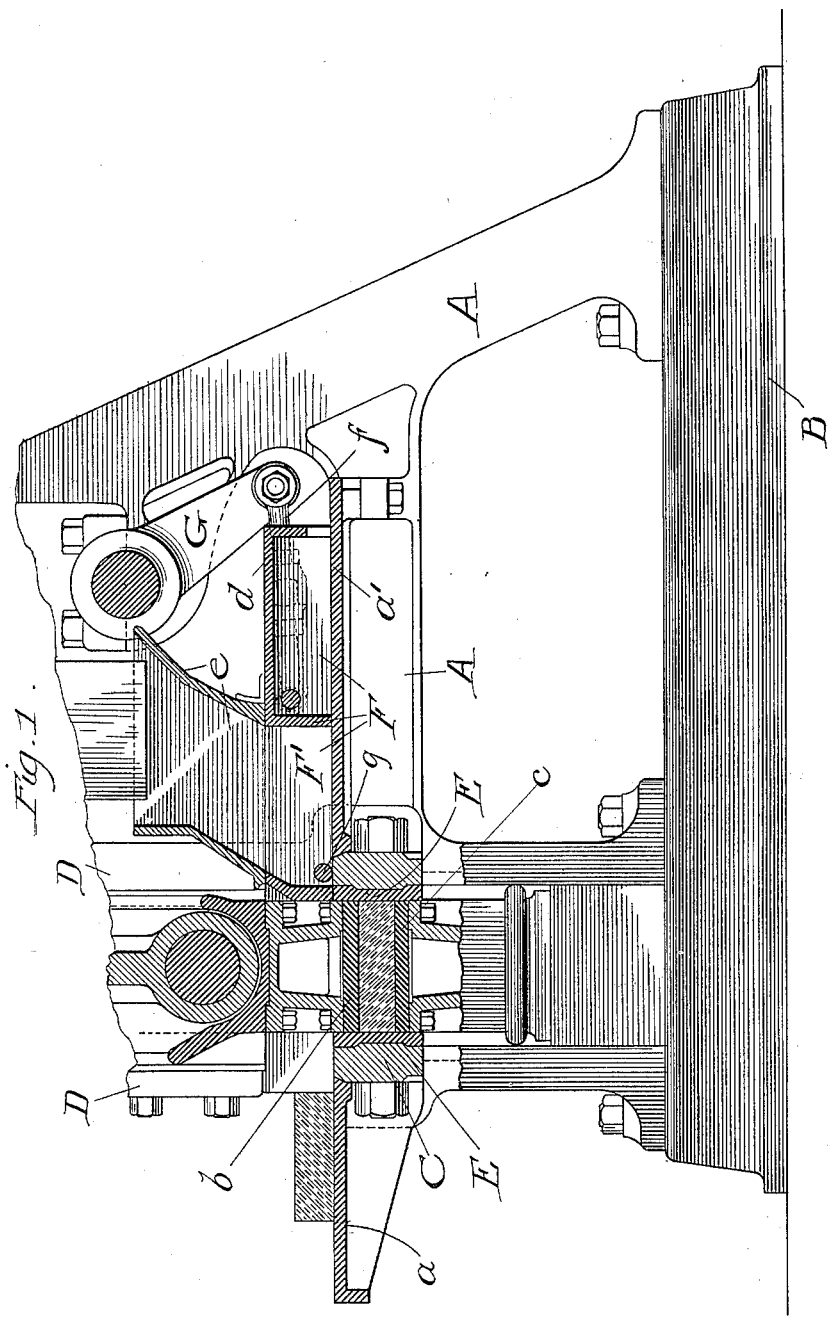
Figure 2:
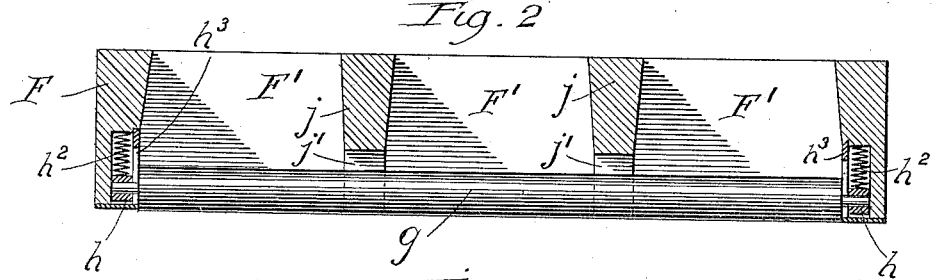
Figure 3:
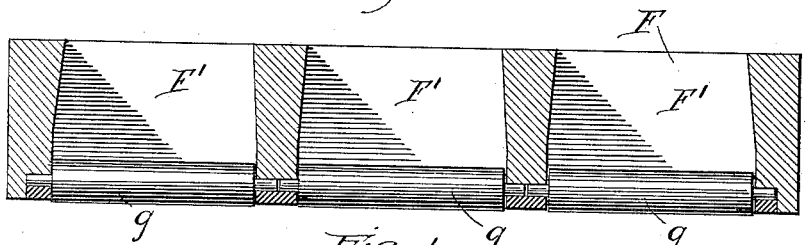
Figure 4:
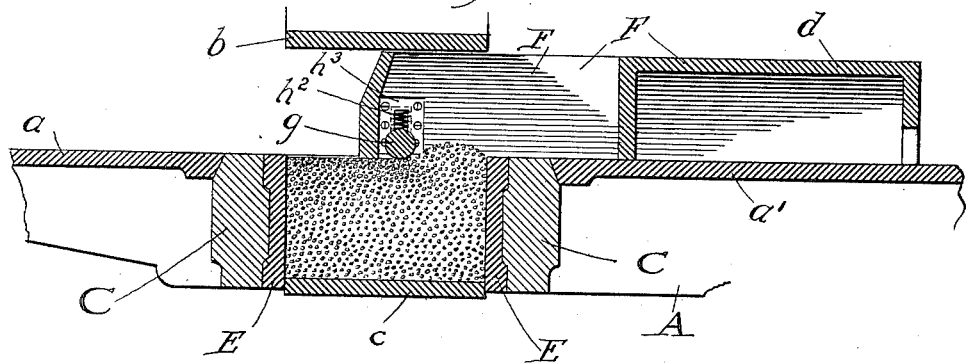
Figures 5, 6, 7:
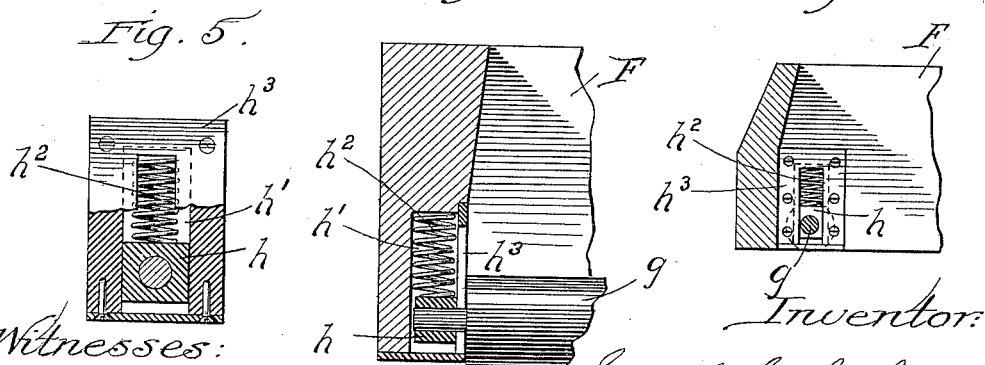

Figure 1 is a vertical section of the press, showing the feed-hopper, reciprocating charger or feed-box, the means for actuating the same, a mold and plungers, with material within said mold to be acted on, and a roller attached to the charger or feed-box. Fig. 2 represents a front view in section of the feed-box or charger adapted for use in a three-mold machine, showing a single roller extending entirely across the feed-box, said roller having bearings at its extremities in the sides of said feed-box. Fig. 3 represents a number of rollers, one for each mold, attached to the sides and interior partitions of the feed-box or charger. Fig. 4 represents the roller attached to the feed-box, said roller being drawn partially across the mold and illustrating the method whereby the material in said mold is distributed and leveled and thereby prevented from being scraped away from the forward portion of the mold by the forward wall of the receding feed-box. Fig. 5 represents a side view, partly in section, of the adjustable journal-bearing for the roller in the side of the feed-box, showing a coiled spring within a recess in the side of the feed-box. Fig. 6 is a front view of the roller, adjustable journal-bearing, and coiled spring.

Fig. 7 shows the adjustable journal-bearing for the roller, the coiled spring, and also the slotted retaining-plate whereby said spring and journal-bearing are held in place within said recess.

Similar letters refer to similar parts throughout the several views.

The main frame of the machine consists of two heavy vertical frame-plates A, arranged parallel with each other at opposite sides of the machine and mounted upon and attached to a base or foundation B. Only one of these frame-plates A is shown.

C is a mold-table which is located at a convenient distance above the foundation B and is arranged horizontally between and bolted at its ends to the vertical guide-standards D, one on each side of the machine. Only one of these standards is shown. Within said mold-table are located molds E, which in the machine shown are three in number. Horizontal extensions of said mold-table C at the front and rear of the molds E for the purpose of supporting the feeding devices for the clay and the completed brick or block are formed by means of a horizontal plate $a$ at the front of the molds and by a second horizontal plate $a'$, located at the rear of the molds and sustained by attachment to the frame-plates A. The upper plunger $b$ and the lower plunger $c$ reciprocate in the guide-standards D and form the upper and lower faces of the molds E.

F is the feed-box or charger, constructed to slide upon the rear extension $a'$ of the mold-table. Said feed-box or charger is provided in the usual manner with compartments F' in its forward part corresponding in location with the molds. Said feed-box or charger has at the rear of its said compartments a horizontal top surface $d$, by which the descent of material from the hopper $e$ is cut off as the feed-box is advanced. The hopper $e$ is so arranged as to discharge into the feed-box when the latter is in a retracted position. The reciprocation of the feed-box is effected by means of the pitman $f$, which is operated by the rocker-arm G.

Near the forward extremity of the feed-box F and mounted transversely therein at the bottom thereof is the roller $g$. Said roller and the means of mounting the same in the feed-box may assume various forms, and I will first describe the form shown in Figs. 2, 4, 5, 6, and 7. In said last-mentioned figures the roller $g$ extends entirely across the feed-box F and consists of a cylinder, preferably of metal, journaled at its extremities in the adjustable sliding blocks $h$ $h$. Said sliding blocks $h$ $h$ are movable vertically within the recesses $h'$ $h'$ in the sides of the feed-box F. Between each of the said blocks $h$ $h$ and the upper extremity of each of said recesses $h'$ $h'$ is the coiled compression-spring $h^2$, which bears upon the block $h$ and tends to force the same downward. Said spring $h^2$ and block $h$ are held within said recess $h'$ by means of the slotted retaining-plate $h^3$, secured upon the inner side of the feed-box F, as best shown in Figs. 5 and 6. When the roller $g$ extends entirely across the feed-box, as shown in Fig. 2, the inner compartment-walls $j$ $j$ of the feed-box have recesses $j'$ $j'$ at their lower portions to permit the vertical automatic adjustment of the roller. An alternative construction is shown in Fig. 3, in which a separate roller is provided for each compartment F' of the feed-box F, and the journal-bearings of said rollers are fixed relatively to the feed-box. It is evident, however, that said rollers may have bearings adjustable within said feed-box.

The operation of my device is as follows: The upper plunger $b$ is lifted above the mold in the mold-table, while the lower plunger remains at the top of the mold, bearing thereon the finished brick or block. The feed-box or charger F is then pushed forward by the operation of the rocker-arm G and pitman $f$. Said feed-box having received a charge of clay or other material to be compressed from the hopper $e$ advances over the face of the lower plunger $c$, pushing the finished brick off onto the apron $a$, attached to the mold-table C. The brick having been pushed off the lower plunger, the lower plunger then sinks to the bottom of the mold, and the charge of clay or other material contained in the feed-box fills the mold, the upper plunger still remaining lifted to permit the feed-box to be retracted from its position above the mold. When the feed-box is receding, the roller therein presses upon the clay or other material which has been dropped into the mold from the feed-box and distributes and compacts it in such a manner that the material is evenly distributed in the mold. The plungers are then caused to approach each other to compress the brick in the usual manner familiar to those skilled in the art of manufacturing and operating this class of machines. In the ordinary form of feed-box when this roller is not employed I have found that during the retraction of said feed-box the front wall thereof is apt to scrape or drag a portion of the clay or other material away from the forward upper portion of the mold. On account of this scraping action there is less material left at the front of the mold, and that portion of the completed brick or block which was formed at that portion of the mold contains less material, and is therefore less dense than the other portions of said brick or block. The action of the roller, however, prevents this by compacting the clay at the front of the mold, so that there is as much material at the front of the mold as there is at any other part thereof, and the finished brick, therefore, is of uniform density throughout. Another effect of the operation of said roller is that when clay or other material is to be operated upon the air confined between the granules of the material is forced to escape by reason of the rolling or kneading action of the roller thereon before the action of the plungers. As a result of this action of the roller a greater amount of said material can be introduced into the mold and pressed into the bricks or block. The extra material that without the roller would be scraped from above the mold by the receding feed-box is rolled into said mold, and the roller therefore has the effect of increasing the depth of mold or increasing the amount of material that can be put into a mold of any specified depth.

Although I have shown a roller attached to the feed-box, yet any roller for compacting the material in the mold previously to the action of the compressing device would be within my invention. It is also evident that the form of the machine in connection with which the roller is used may be greatly varied without departing from my invention.

What I claim as new, and desire to secure by Letters Patent, is—

1. In a machine for compressing material into form, a stationary mold and a roller forming an auxiliary compressing mechanism, said roller acting upon the material in the mold prior to the application of the principal compressing mechanism.

2. In a machine for compressing material into form, the combination of a stationary mold, a feed-box adapted to reciprocate across the top of said mold, and a roller carried by said feed-box and adapted to act upon the material delivered to said mold by said feed-box.

3. In a machine for compressing material into form, a reciprocating feed-box having a roller arranged therein adjacently to the front wall thereof and transversely to the direction of motion of said feed-box, and adapted to act upon the material in the mold.

4. In a machine for compressing material into form, a reciprocating feed-box having an adjustable roller arranged therein adjacently to the front wall thereof and transversely to the direction of motion of said feed-box and adapted to act upon the material in the mold.

5. In a machine for compressing material into form the combination of a mold, a feed-box for charging said mold, a roller within said feed-box for acting upon the material within said mold, and compressing mechanism.

6. In a machine for compressing material into form, the combination of a mold, a feed-box for charging said mold, an adjustable roller within said feed-box for acting upon the material within said mold, and compressing mechanism.

7. In a machine for compressing material into form, the combination of a mold, a reciprocating plunger adapted to enter said mold, a reciprocating feed-box for charging said mold, and a roller within said feed-box transverse to the direction of the motion thereof, and adapted to act upon the material in said mold when said feed-box is being retracted.

8. In a brick-machine, the combination of a plurality of vertically-reciprocating plungers and an auxiliary compressing mechanism for partially compressing the clay or other material prior to the compressive action of said plungers, said auxiliary mechanism embracing parts moving in a direction transverse to the direction of motion of said plungers.

SAMUEL S. CHISHOLM.

Witnesses:
H. J. FLOOD,
HOWARD M. COX.